United States Patent [19]

Mizuno et al.

[11] 4,172,362
[45] Oct. 30, 1979

[54] THERMAL REACTOR HAVING COLLECTOR THEREIN TO MIX PULSED FLOWS OF EXHAUST AND SECONDARY AIR

[75] Inventors: Yukio Mizuno, Tachikawa; Midori Hiramoto, Tanashi, both of Japan

[73] Assignee: Fuji Jukogyo Kabushiki Kaisha, Tokyo, Japan

[21] Appl. No.: 794,611

[22] Filed: May 6, 1977

Related U.S. Application Data

[62] Division of Ser. No. 605,157, Aug. 15, 1975, Pat. No. 4,037,407.

[30] Foreign Application Priority Data

Nov. 28, 1974 [JP] Japan ................. 49-137321

[51] Int. Cl.² .................. F02B 75/10; F01N 3/10
[52] U.S. Cl. ........................... 60/278; 60/282; 60/305; 60/312; 60/323
[58] Field of Search ............... 60/293, 303, 304, 305, 60/312, 323, 282, 278, 313, 323, 317

[56] References Cited

U.S. PATENT DOCUMENTS

| | | | |
|---|---|---|---|
| 3,201,338 | 8/1965 | Pennington | 60/278 |
| 3,302,394 | 2/1967 | Pahnke et al. | 60/302 |
| 3,413,803 | 12/1968 | Rosenlund et al. | 60/282 |
| 3,662,541 | 5/1972 | Sawada et al. | 60/305 |
| 3,797,241 | 3/1974 | Kern | 60/305 |
| 3,836,338 | 9/1974 | Arnold | 60/303 |
| 3,839,862 | 10/1974 | Gota et al. | 60/282 |
| 3,946,558 | 3/1976 | Beekhuis et al. | 60/282 |

FOREIGN PATENT DOCUMENTS 440955  1/1936  United Kingdom ................. 60/313

Primary Examiner—Carlton R. Croyle
Assistant Examiner—Thomas I. Ross
Attorney, Agent, or Firm—Martin A. Farber

[57] ABSTRACT

An exhaust gas purification system for internal combustion engines comprising two exhaust gas passages which are substantially equal in length and each of which has a substantially constant cross-section. A thermal reactor communicates with the exhaust gas passages, and a collector is provided on the open ends of the exhaust gas passages. Since the ignition timing of every cylinder is different from each other, the mass of exhaust gases and the mass of secondary air are ejected from the exhaust passages in different phases. The collector is formed to collect and mix the mass of exhaust gases and the mass of secondary air which are ejected from both of the exhaust gas passages at a different time, and has an outlet for discharging the exhaust gases and the secondary air into the chamber of the thermal reactor with mixing thereof. In order to introduce sufficient amounts of secondary air after the mass of exhaust gas has discharged, each exhaust gas passage is formed with a volume equal to a displacement volume of the cylinder of the engine and less than four times the displacement volume thereof, and has a cross-sectional area less than three times the opening area of the exhaust valve.

2 Claims, 6 Drawing Figures

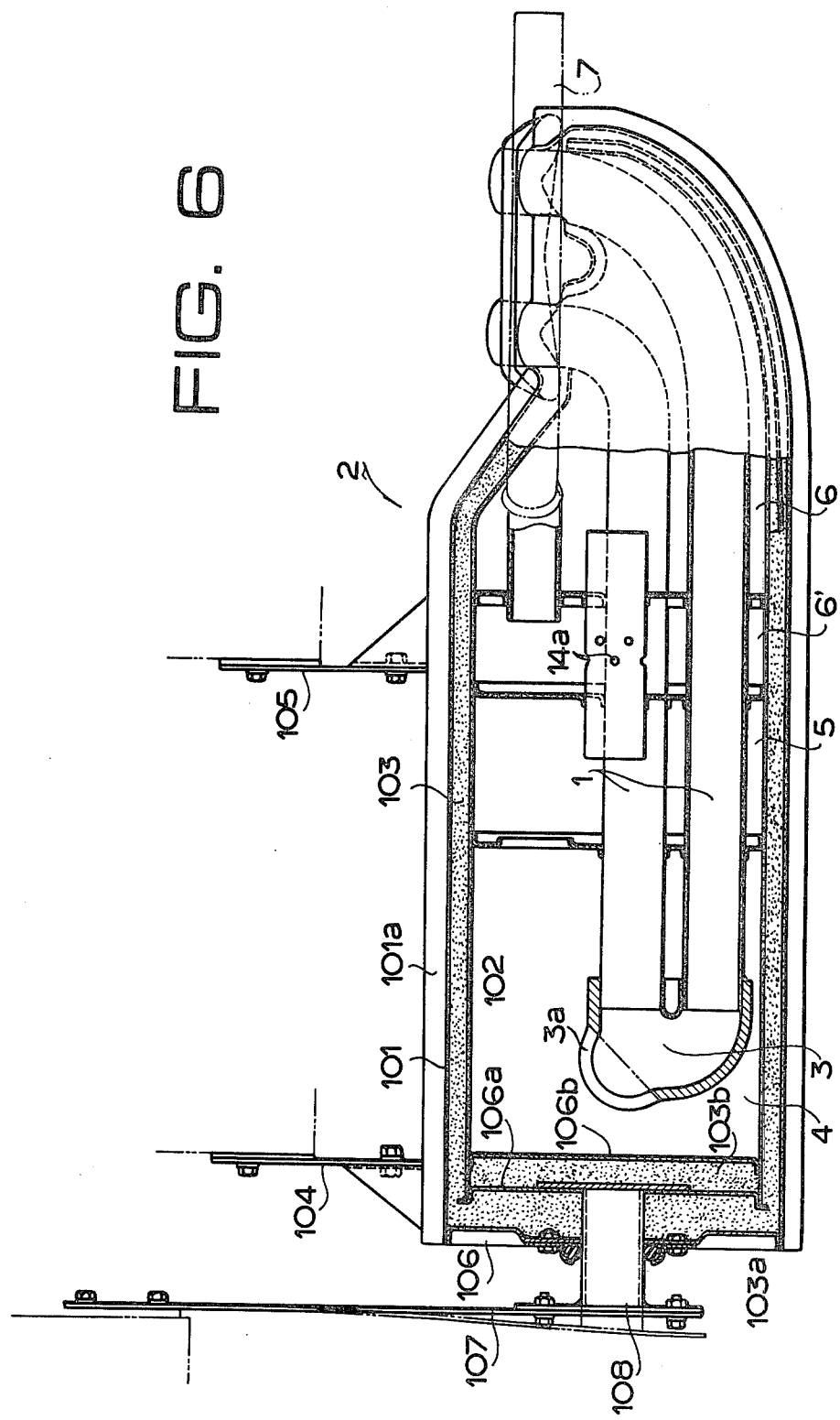

THERMAL REACTOR HAVING COLLECTOR THEREIN TO MIX PULSED FLOWS OF EXHAUST AND SECONDARY AIR

This is a division of application Ser. No. 605,157, filed Aug. 15, 1975, now U.S. Pat. No. 4,037,407.

DETAILED DESCRIPTION OF THE INVENTION

The present invention relates to an exhaust gas purification system for internal combustion engines which is improved to purify the exhaust gases.

An exhaust gas purification system has been proposed in which secondary air is introduced into the exhaust passage through a check valve by exhaust pulsation and where harmful constituents such as CO and HC are oxidized with the secondary air in a thermal reactor provided in the exhaust passage. The secondary air introduction is caused by negative pressure waves which are reflected at the end opening into the thermal reactor. It has been confirmed that the few negative pressure waves are primarily generated after the exhaust gases have passed through the exhaust passage. Therefore, the mass of the secondary air is formed after the mass of the exhaust gases and both masses sequentially pass through the exhaust passage and enter into the thermal reactor. Since a multi-cylinder engine is designed to avoid the interference between masses of exhaust gases from every cylinder, also in the multi-cylinder engine, the mass of exhaust gases and the mass of secondary air pass through the exhaust passage without mixing. In the conventional exhaust gas purification system, such as in U.S. Pat. No. 3,946,558, the exhaust gases and the secondary air pass through the reactor without mixing with each other. Therefore, sufficient oxidation cannot be expected in the system. In order to carry out the desired oxidation reaction in the reactor, the reactor must be constructed to have a large volume.

An object of the present invention is to provide an exhaust gas purification system which can mix the exhaust gases with the secondary air in the thermal reactor to promote the oxidation of the harmful exhaust gas constituents.

In accordance with another object of the present invention in this respect, the system of the present invention comprises two exhaust passages of which each exhaust passage includes an exhaust port in the cylinder head and an exhaust pipe and has a length substantially equal to that of the other exhaust passage and a substantially constant cross-section, a collecting means being provided on the open ends of the exhaust pipes, and a thermal reactor having a reaction chamber being provided for enclosing the collecting means. The collecting means is provided for collecting the mass of the exhaust gases and the mass of the secondary air which are ejected from both of the exhaust pipes and for discharging same from an outlet into the reaction chamber of the thermal reactor. Because the ignition timing is set differently, the mass of the exhaust gases and the mass of the secondary air are ejected from both exhaust pipes in different phase. More particularly, when the mass of the exhaust gases are ejected from one of the exhaust pipes, the mass of the secondary air is ejected from the other exhaust pipe. Accordingly, both masses collide with each other in the collecting means, and as a result the exhaust gases are mixed with the secondary air. When the mixture discharges from the outlet into the thermal reactor, the mixing is further enhanced. Thus, the effective oxidation of the harmful constituents may take place in the thermal reactor. In order to introduce a large amount of secondary air after the mass of the exhaust gas has discharged from the each of the exhaust passages, each exhaust gas passage is formed with a volume equal to a displacement volume of the cylinder of the engine and less than four times the displacement volume, and has a cross-sectional area less than three times the opening area of the exhaust valve.

The present invention will be more fully understood from the following description with reference to the accompanying drawings, in which:

FIG. 6 is a longitudinal sectional view on a larger scale of a thermal reactor according to the present invention.

As described above, secondary air is mainly introduced after the exhaust gas has passed through the exhaust gas passage. In order to introduce a large amount of secondary air, the inventors conducted an experiment on the variation of the amount of the secondary air according to the volume and cross-sectional area of the exhaust passage, and as a result obtained the resultant data as shown in FIGS. 1 to 3.

Figure 1:
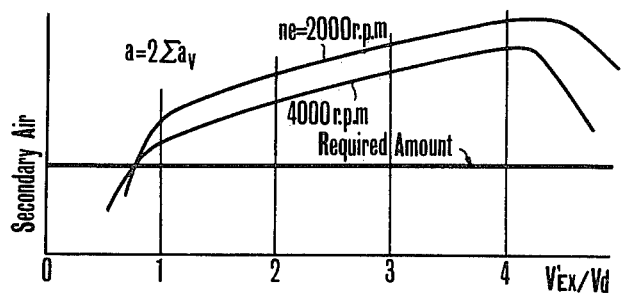
FIG. 1 is a graph showing a relationship between the volume of the exhaust passage and the amount of secondary air.

Referring now to the drawings, FIG. 1 includes a vertical axis for intake amounts of the secondary air, and a horizontal axis for the ratio of the volume (V'ex) of the exhaust passage which extends from the passage to the engine displacement (Vd). The exhaust passage extends from the exhaust valve to the inlet of an expanded chamber or thermal reactor and is formed to have a uniform diameter without an expanded portion so as to pass exhaust gases therethrough continuously and smoothly in their discharging order. Curves in FIG. 1 are given in accordance with the engine revolutions of 2,000 r.p.m. and 4,000 r.p.m. where the cross-sectional area (a) of the exhaust passage is twice as large as the maximum opening area (av) of the exhaust valve, or the total maximum opening area (Σ av) of the exhaust valves, if said valves are simultaneously operatively connected to a common exhaust passage.

Figure 2:
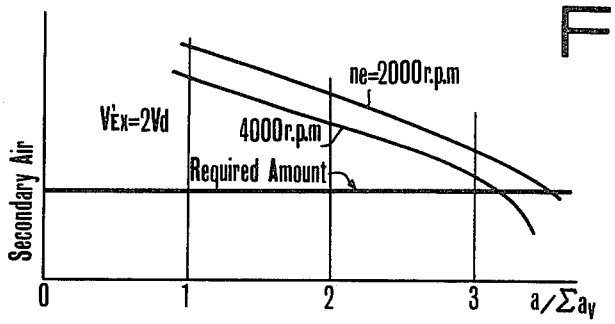
FIG. 2 is a graph showing a relationship between the sectional area of the exhaust passage and the amount of secondary air.
Figure 3:
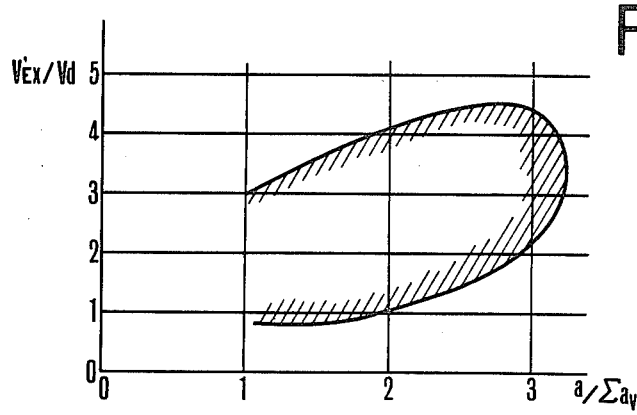
FIG. 3 is a graph showing a zone to obtain a sufficient amount of secondary air.

FIG. 2 includes a vertical axis for the intake amounts of the secondary air, and a horizontal axis for the ratio of the cross-sectional area (a) of the exhaust passage to the maximum opening area (av) of the exhaust valve or the total maximum opening area (Σ av) of the exhaust valves. Curves in FIG. 2 are given in accordance with the engine revolutions of 2,000 r.p.m. and 4,000 r.p.m. where the volume (V'ex) of the exhaust passage is twice as large as that the volume of the engine displacement (Vd).

It will be understood that in order to obtain a desired amount of secondary air, V'ex/Vd should be selected in a region from 1 to 4 in reference to FIG. 1, and a/av or a/Σ av should be defined below three in reference to FIG. 2.

With reference to FIG. 3 which shows overall test results when a/Σ av and V'ex/Vd are varied, below 4,000 r.p.m., it will be seen that the volume and cross-sectional area of the exhaust passage should be selected within the illustrated hatched zone to maintain the sufficient amount of secondary air.

It is necessary to maintain the exhaust gases at the open end of the exhaust passage which opens into the thermal reactor above a temperature (defined as the trigger temperature of a thermal reactor) which is sufficient to oxidize the harmful components of the exhaust gases in the thermal reactor.

Figure 4:
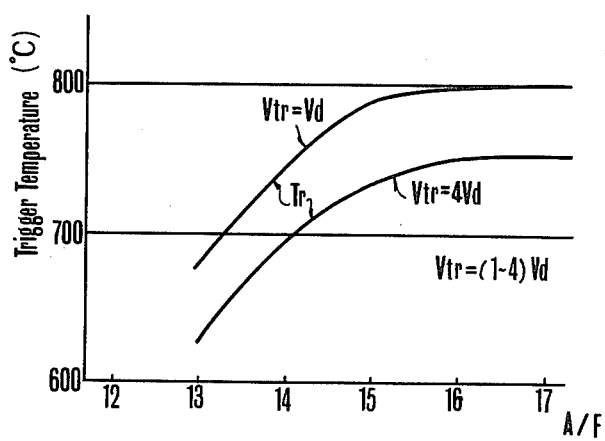
FIG. 4 is a graph showing a relationship between the air-fuel ratio and the trigger temperature in the thermal reactor.

FIG. 4 indicates this trigger temperature given provided experimentally in accordance with the air fuel ratio and the volume (Vtr) of the thermal reactor. There are illustrated two curves for the trigger temperature, the upper side one corresponding to a volume of the thermal reactor equal to that of the engine displacement, and the lower one corresponding to the volume the former being four times of that of the latter.

In the case where the thermal reactor of this invention is used in general type engines, it is required to provide heat insulation for the exhaust passage which includes an exhaust port and an exhaust pipe, to prevent the exhaust gases from radiating heat, because the exhaust gases in passing through the exhaust passage otherwise is apt to fail below the trigger temperature.

Figure 5:
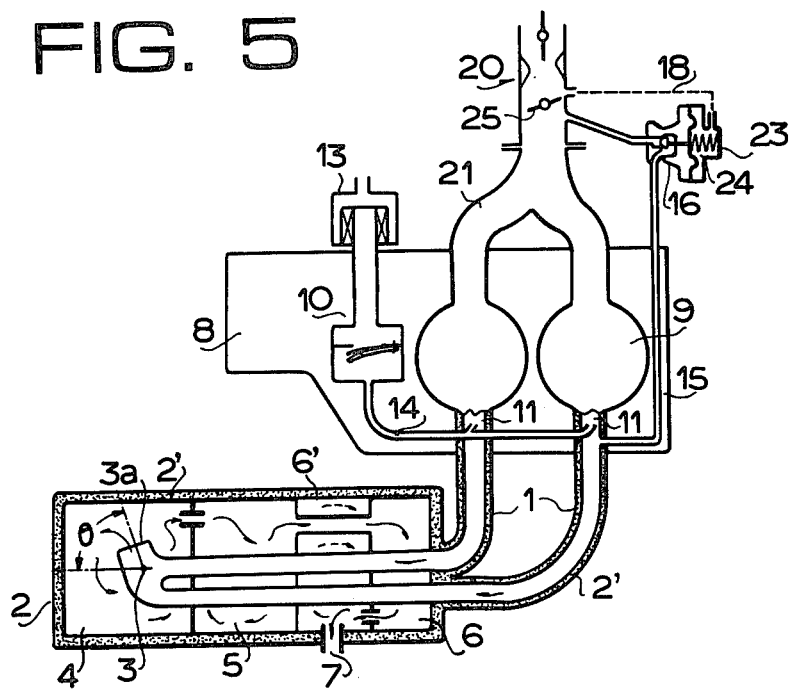
FIG. 5 is a schematic illustration showing an embodiment of the present invention.

FIG. 5 illustrates an engine 8 according to the present invention including two exhaust pipes 1 each of which extends from an exhaust port 11 communicating with a cylinder 9 to a reaction chamber 4 of a thermal reactor 2. The exhaust pipes 1 are inserted into the reaction chamber of the thermal reactor 2 and a collector called a collecting means 3 is provided on the ends of the exhaust pipes. The collecting means has an outlet 3a and is formed to collect the mass of exhaust gases and the mass of the secondary air so as to mix same with each other and to eject the mixture mass from the outlet 3a. The outlet 3a is directed in a deflection direction defining an angle θ relative to the axis of the exhaust pipe. Accordingly, the mass of the exhaust gas and the mass of the secondary air which are ejected from both exhaust pipes collide with each other to form a mixture thereof, and the mixture mass then discharges from the outlet 3a. When the mixture discharges from the outlet 3a, mixing of the exhaust gas and the secondary air is enhanced. The deflection angle θ may preferably be selected from 30 degrees to 70 degrees so as to avoid heat damage to end plates 106a and 106b of the chamber 4. Each of the exhaust passages (which includes the exhaust port 11 in the cylinder head and the exhaust pipe 1) substantially has a constant cross-section in which the mass of the exhaust gases pass continuously therethrough without mixing therein with a subsequent mass of secondary air, and has a length substantially equal to that of the other exhaust passage for obtaining balance between the exhaust gas effects in both exhaust passages. Further, the exhaust gas passage has a volume and cross-sectional area limited within the hatched area of FIG. 3. The exhaust port is lined with a liner and the exhaust pipe 1 is also covered with a heat insulation material 2'.

The thermal reactor 2 further includes muffler chambers 5, 6, 6', adjacent to the reaction chamber 4, through which the reaction chamber 4 communicates with a tail pipe 7.

A secondary air passage 14 communicates with the exhaust ports 11 for introducing the secondary air through a check valve 10 and an air filter 13. An exhaust gas recirculation passage 15 communicates the exhaust port 11 with an intake passage 21 through a diaphragm valve 16 for recirculation of the exhaust gas. The diaphragm valve 16 has a negative pressure actuator 23, chamber 24 of which communicates with the intake passage of a carburetor 20 at an upstream side of the throttle valve 25 via a passage 18, so that the valve 16 may be opened by the actuator 23 when pressure in the chamber 24 is negative.

In operation, the exhaust gases are recirculated to the intake system through the valve 16, so that the combustion in the cylinder is delayed, bringing the combustion closer to a constant-temperature combustion. Consequently, the exhaust gases pass through the exhaust passage at a high temperature when the exhaust valve is opened.

The secondary air is sufficiently supplied through the air filter 13 and the check valve 10 to the exhaust port via the check valve 10, because the exhaust passage has a volume and a passing cross-sectional area defined within the hatched area of FIG. 3.

Thus, a large mass of secondary air is formed and introduced after the mass of exhaust gas passes therethrough. Since each exhaust passage has a substantially constant cross-section and a length substantially equal to that of the other exhaust passage and since ignition timing of every cylinder is set with a difference with respect to one another, the mass of the exhaust gas and the mass of the secondary air discharge from both exhaust passages in different phase.

In other words, when the mass of the exhaust gases is ejected from one of the exhaust pipes, the mass of the secondary air is ejected from the other exhaust pipe. Both of these masses which are discharged from the exhaust passages are collected to collide with each other in the collecting means. Therefore, the exhaust gas is mixed with the secondary air in the collecting means passing therethrough. Thereafter, the mixture of the exhaust gas and the secondary air discharges from the collecting means into the enlarged chamber 4 of the thermal reactor from the relatively narrow outlet 3a, where the mixing effect is still further effected.

In the reaction chamber 4, the exhaust gases and secondary air are further mixed by their turbulence so that oxidation is greatly promoted. (In conventional systems to the contrary, the mass of exhaust gases and the mass of secondary air pass through the thermal reactor keeping their respective mass conditions).

In accordance with the present invention, the mass of the exhaust gases and the mass of the secondary air are discharged from the collecting means with intimate mixing thereof without leaving separated masses thereof. Therefore, oxidation in the thermal reactor quite effectively takes place. Thus, it may be seen that the thermal reactor may be constructed with and in a small volume.

The thermal reactor 2 serving as a muffler comprises a double shell structure as illustrated in FIG. 6. Namely, the thermal reactor includes an outer shell 101 formed into a hollow cylinder having an oval cross-section by combining of two half-shell members having flanges 101a so as to be connected with each other, and an inner shell 102 disposed in the outer shell 101.

The inner shell 102 is also formed into a hollow cylinder having an oval cross-section and is coaxially positioned relative to the outer shell 101.

The space between the shells 101 and 102 is filled with a heat insulating material 103. The double shell structure is supported on the chassis by two suspension plates 104 and 105, and has three end plates 106, 106a and 106b and two heat-insulation layers 103a and 103b each disposed between adjacent two members of the end plates. The double shell structure is further supported at its end by means of a suspension plate 107 made of steel, which includes a tubular rod 108 slidably penetrating the outer end plate 106 and rigidly connected to the middle end plate 106a by means of welding. Accordingly, thermal expansion of the inner shell 102 is permitted.

From the foregoing it will be observed that the present invention provides an exhaust gas purification system in which exhaust gases are sufficiently mixed with secondary air by the collecting means, whereby effective oxidation of the harmful exhaust gas constituents can take place to reduce the concentration of the constituents in the exhaust gases.

It will be noted that the reaction chamber 4 may be directly communicated with the tail pipe 7 without passing through the muffler chambers 5, 6 and 6'.

What is claimed is:

1. An exhaust gas purification system for internal combustion engines comprising at least two cylinders including two exhaust gas passages, respectively, defining open ends, respectively, each of said exhaust gas passages including an exhaust pipe and an exhaust port and an exhaust valve communicating respectively with one another, each of said exhaust gas passages being formed with a substantially constant cross-section up to and including said open ends, in which a mass of exhaust gases passes without mixing with a subsequent mass of secondary air, a thermal reactor having a reaction chamber operatively communicating with said exhaust pipes, said exhaust pipes of said two exhaust gas passages being inserted into said reaction chamber spaced apart in parallel, heat insulating means in said exhaust gas passages for maintaining the temperature of said exhaust gases above a trigger temperature of said thermal reactor, a secondary air passage including a check valve communicating with said exhaust gas passages, respectively, providing the mass of secondary air into each of said exhaust pipes, respectively, a collecting means simultaneously communicating with said open ends of both said exhaust pipes, said collecting means defining a mixing zone and an outlet therefrom, said mixing zone having an entrance portion adjacent said open ends of said exhaust pipes and at least a central portion adjacent said entrance portion, said central portion and said entrance portion having a cross-section substantially equal to the sum of the cross-sections of both of said exhaust pipes, said collecting means for collecting the mass of exhaust gases and the mass of secondary air ejected from said exhaust pipes at said open ends, respectively, in said mixing zone, said collecting means and said mixing zone being formed so as to cause collision and diffusion of the mass of the exhaust gases and the mass of the secondary air, respectively, thereby effecting mixing thereof, said mixing zone including an outlet portion of bulge shape forming said outlet therein, said outlet defining a narrowmost portion of said collecting means and defining a radius of curvative smaller than an adjacent portion of said mixing zone, and said collecting means being disposed in said reaction chamber of said thermal reactor and having said outlet communicating therewith and for discharging a mixture of said exhaust gases and said secondary air from said outlet into said reaction chamber of said thermal reactor.

2. The exhaust gas purification system as set forth in claim 1, wherein said open ends of both of said exhaust pipes face the same direction.

* * * * *